(No Model.)

H. B. OGDEN.
CAR FENDER.

No. 527,715. Patented Oct. 16, 1894.

WITNESSES:
H. Walker
C. Sedgwick

INVENTOR
H. B. Ogden
BY
Munn & Co.
ATTORNEYS.

UNITED STATES PATENT OFFICE

HERMAN B. OGDEN, OF BROOKLYN, NEW YORK.

CAR-FENDER.

SPECIFICATION forming part of Letters Patent No. 527,715, dated October 16, 1894.

Application filed January 24, 1894. Serial No. 497,902. (No model.)

*To all whom it may concern:*

Be it known that I, HERMAN B. OGDEN, of Brooklyn, in the county of Kings and State of New York, have invented a new and Improved Car-Fender, of which the following is a full, clear, and exact description.

My invention relates to improvements in car fenders such as are attached to the ends of cars, particularly street cars, to prevent people from getting caught beneath them, and the object of my invention is to produce a very cheap, durable, substantial and simple fender, which may be instantly attached to or removed from any ordinary car, which is adapted to run at an incline with its lower end close to the track, so as to catch any person with whom it comes in contact and prevent the person from being run over by the car, and which is also adapted to fold upward and be held against the ordinary rigid car fender, or dashboard when not in use, so as to be entirely out of the way.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1:
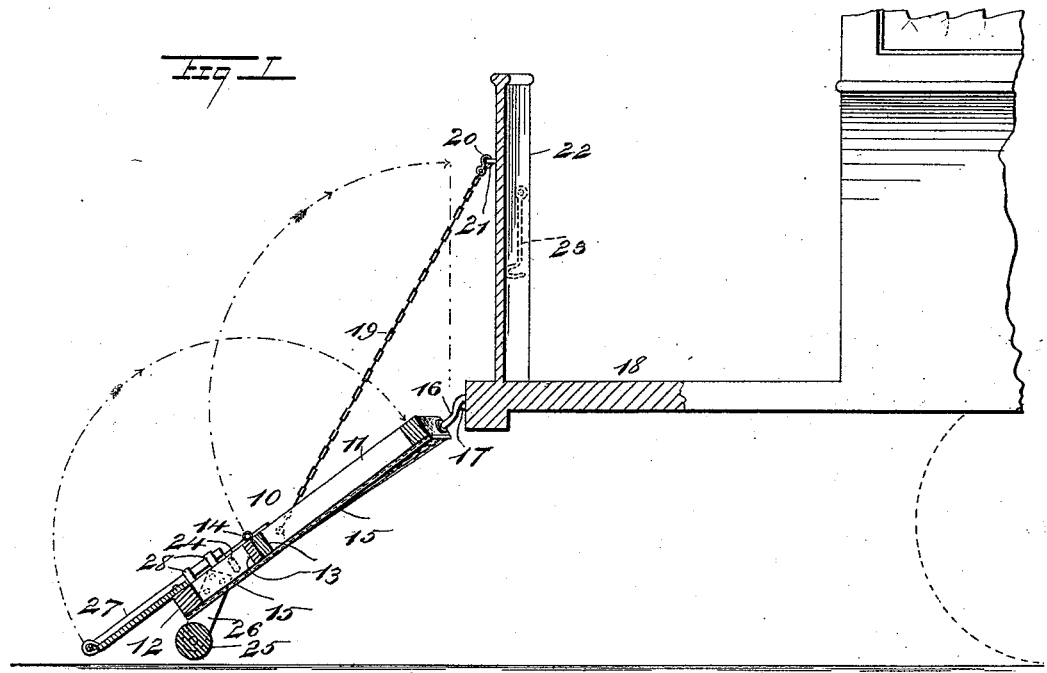
Figure 2:
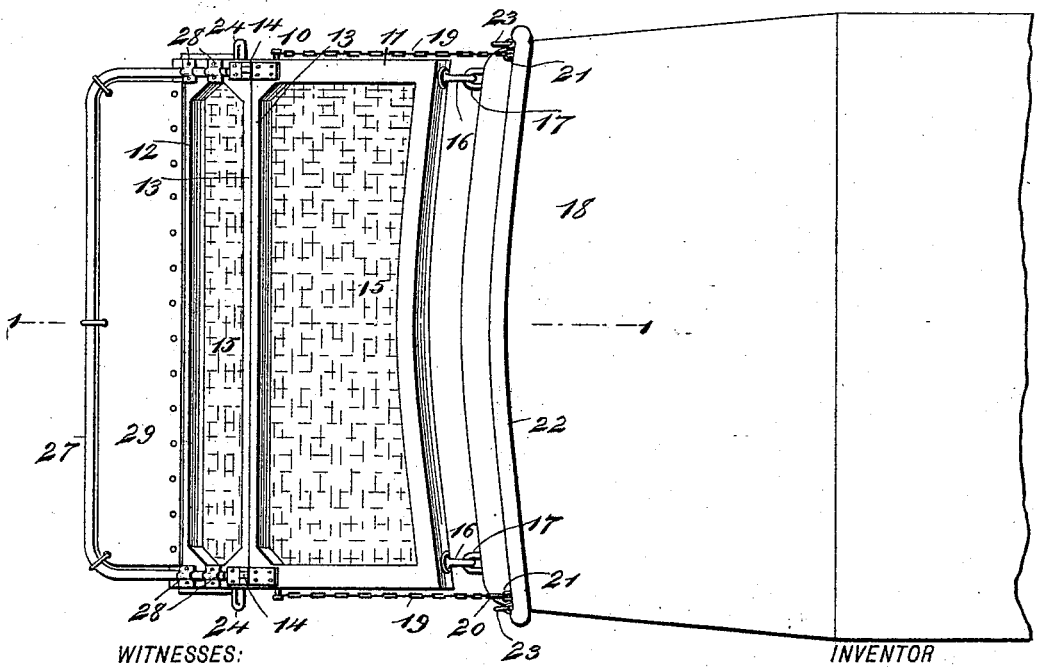

Figure 1 is a vertical section on the line 1—1 of Fig. 2, showing my improved fender as applied to a car and in position for use; and Fig. 2 is a plan view of the same.

The fender 10 is made up principally of two frames 11 and 12, which are preferably of a generally rectangular shape, the frame 11 being the larger and adapted to be placed next the car, while the frame 12 is hung on the lower edge of the frame 11. The frames have meeting rails or cross bars 13 and at the ends of the cross bars are hinges 14 which permit the lower frame 12 to be folded upward upon the frame 11, as indicated by dotted lines in Fig. 1, but when the fender is in open position ready for use, the frame 12 is in alignment with the frame 11 and the abutting cross bars 13 prevent the frame 12 from swinging too low or sagging.

The bottoms of the frames 11 and 12 are covered by a netting 15 of wire or other suitable material, and the upper frame 11 has, at its upper edge, hooks 16 which are adapted to engage the draft rings 17 on the end of the car 18, which car may be of any usual construction, and as street cars are usually provided with draft rings, it will be seen that the fender may be instantly attached or detached.

The upper edge of the frame 11 is shaped to fit the end of the car, as shown in Fig. 2. The fender is supported at the right angle by means of chains 19, which are attached to its sides and terminate in hooks 20 which engage eyes 21 on the dashboard 22 of the car. The fender, when not in use, is adapted to be folded upward against the rigid fender or dashboard 22, as the dotted lines in Fig. 1 indicate, and to hold it in this position hooks 23 are employed, which are pivoted on the sides of the fender 22 and are adapted to engage eyes 24 on the fender 10.

Depending from the sides of the frame 12 are arms 26 which carry a roller 25, this being arranged just below the lower end of the frame 12 and just above the roadbed, which it strikes when any unusual pressure is placed on the fender 10 or when the car may rock from overloading at the front end or on a rough track. At the lower end of the frame 12 is a U-shaped frame 27, which projects downward parallel with the open fender 10 and the sides of which are held in keepers 28, or equivalent fastenings on the frame 12. This frame supports a plate 29 which is also fastened to the frame 12, and the frame 27 and plate 29 form an extension to the fender, this extension projecting in front of the roller 25 and to a point very near the roadbed, so that in case a person is run down, the extension trips him up and he falls uninjured on the fender 10, his weight causing the roller 25 to come into contact with the roadbed and thus furnish a firm support for the fender.

From the above description it will be seen that the fender is composed of very few parts, that it is exceptionally strong, that it may be easily raised by means of the chains 19 and folded against the fender or dashboard 22, that when necessary it may be quickly and easily detached from the car, that it may yield and swing upward without injury when it strikes the ground, and does not interfere with the headlight or any part of cars as now constructed; also that the headlight cannot be used unless the fender is put down in position for use.

Having thus described my invention, I claim as new and desire to secure by Letters Patent—

1. A car fender, comprising two frames hinged together and adapted to be hung on a car, a roller supported beneath the lower frame, and an extension end on the lower frame, substantially as described.

2. A car fender, comprising two frames hinged together and having suitable covering, a roller supported beneath the lower frame, an extension end fastened to the lower frame, fastening devices on the upper edge of the top frame to attach it to a car, and chains on the sides of the fender to support it, substantially as described.

3. The combination, with the two frames hinged together, as specified, of the depending arms on the lower frame, the roller carried by the arms, and the extension end on the lower frame comprising a U-shaped frame and a cover plate, substantially as described.

HERMAN B. OGDEN.

Witnesses:
C. SEDGWICK,
F. W. HANAFORD.